(12) United States Patent
Kumagai

(10) Patent No.: US 8,939,284 B2
(45) Date of Patent: Jan. 27, 2015

(54) CUSHION OF FOLDING PORTABLE ELECTRONIC DEVICE AND WATERPROOF STRUCTURE OF FOLDING PORTABLE ELECTRONIC DEVICE

(75) Inventor: Keiichirou Kumagai, Minato-ku (JP)

(73) Assignee: NEC Corporation, Tokyo (JP)

( * ) Notice: Subject to any disclaimer, the term of this patent is extended or adjusted under 35 U.S.C. 154(b) by 144 days.

(21) Appl. No.: 13/639,789

(22) PCT Filed: Apr. 28, 2011

(86) PCT No.: PCT/JP2011/002496
§ 371 (c)(1),
(2), (4) Date: Oct. 5, 2012

(87) PCT Pub. No.: WO2011/142098
PCT Pub. Date: Nov. 17, 2011

(65) Prior Publication Data
US 2013/0020747 A1    Jan. 24, 2013

(30) Foreign Application Priority Data

May 10, 2010    (JP) .................................. 2010-108010

(51) Int. Cl.
B65D 85/00    (2006.01)
H04M 1/02    (2006.01)
H04M 1/18    (2006.01)
G06F 1/16    (2006.01)

(52) U.S. Cl.
CPC .............. *H04M 1/0214* (2013.01); *H04M 1/18* (2013.01); *G06F 1/1656* (2013.01); *H04M 1/185* (2013.01)
USPC .................... 206/320; 455/575.8; 361/679.1; 361/683

(58) Field of Classification Search
USPC ........... 206/320; 361/679.01, 683; 455/575.8; 267/139, 140; 312/223.1, 296
See application file for complete search history.

(56) References Cited

U.S. PATENT DOCUMENTS

2006/0274493 A1*  12/2006  Richardson et al. .......... 361/683
2007/0235309 A1*  10/2007  Tsu ............................... 200/515

(Continued)

FOREIGN PATENT DOCUMENTS

| CN | 101155202 A | 4/2008 |
|----|-------------|--------|
| JP | 2002-305569 A | 10/2002 |
| JP | 2003-163727 A | 6/2003 |
| JP | 2004-328186 A | 11/2004 |
| JP | 2005-159566 A | 6/2005 |
| JP | 2005-333290 A | 12/2005 |
| JP | 2005-340682 A | 12/2005 |
| JP | 2009-005326 A | 1/2009 |

OTHER PUBLICATIONS

Office Action, dated Jun. 5, 2014, issued by the State Intellectual Property Office of the People's Republic of China, in counterpart Application No. 201180023708.3.
Communication dated May 27, 2014, issued by the European Patent Office in corresponding Application No. 11780358.5.
Japanese Office Action for corresponding Application No. 2012-514702 issued Dec. 2, 2014.

*Primary Examiner* — Christopher Schwartz
(74) *Attorney, Agent, or Firm* — Sughrue Mion, PLLC

(57) ABSTRACT

There is disclosed a cushion of a folding portable electronic device which can prevent the increase of manufacturing cost, prevent the permeation of water into cases and prevent the cases from being damaged at a folding operation. A cushion 107 includes a projecting part 107*a* which is disposed in one case 110 and projects from one surface to come in contact with the other case in a closed state; and a body part 107*b* having a side surface sandwiched between an outer surface of a frame constituent member 101 which constitutes a frame of the one surface and an inner surface of a back surface constituent member 102 to cover a back surface which is the surface on a side opposite to the one surface of the one case, whereby the body part closely comes in contact therewith.

5 Claims, 7 Drawing Sheets

(56) References Cited

U.S. PATENT DOCUMENTS

| | | | |
|---|---|---|---|
| 2008/0053852 A1* | 3/2008 | Ko et al. | 206/320 |
| 2008/0081679 A1 | 4/2008 | Kawasaki et al. | |
| 2008/0316687 A1* | 12/2008 | Richardson et al. | 361/680 |
| 2009/0086420 A1 | 4/2009 | Stockham et al. | |
| 2009/0264160 A1 | 10/2009 | Mochizuki et al. | |
| 2010/0147737 A1* | 6/2010 | Richardson et al. | 206/701 |

* cited by examiner

CUSHION OF FOLDING PORTABLE ELECTRONIC DEVICE AND WATERPROOF STRUCTURE OF FOLDING PORTABLE ELECTRONIC DEVICE

CROSS REFERENCE TO RELATED APPLICATIONS

This application is a National Stage of International Application No. PCT/JP2011/0002496, filed on Apr. 28, 2011, which claims priority based on Japanese Patent Application No. 2010-108010, filed May 10, 2010, the contents of all of which are incorporated herein by reference in their entirety.

TECHNICAL FIELD

The present invention relates to a cushion of a folding portable electronic device and a waterproof structure of the folding portable electronic device.

BACKGROUND ART

In recent years, portable electronic devices each having a waterproof function have increased. The waterproof function of each portable electronic device is realized by preventing the permeation of water into a case of the device with a waterproof packing incorporated into the case.

In Patent Literature (PTL) 1, there is disclosed a portable electronic device including a frame-like waterproof packing which surrounds an opening for display.

Moreover, there is a folding portable electronic device in which one case and the other case are connected at the ends thereof. In such a folding portable electronic device, the cases come in contact with each other and are damaged sometimes, when a user performs a folding operation.

In PTL 2, there is disclosed a folding portable electronic device in which a shock absorbing cushion is disposed in a portion of one case which comes in contact with the other case.

CITATION LIST

Patent Literatures

PTL 1: JP-A-2005-333290 (paragraphs 0024 to 0032, and FIG. 1)
PTL 2: JP-A-2005-159566 (paragraphs 0032 to 0050, and FIG. 6)

SUMMARY OF INVENTION

Technical Problem

However, when a waterproof packing is disposed in an electronic device for the purpose of preventing the permeation of water into cases and a shock absorbing cushion is further disposed in the electronic device for the purpose of absorbing shock at a folding operation, the number of components of the electronic device and the number of assembling steps increase, which causes the problem that manufacturing cost increases.

Thus, an object of the present invention is to provide a cushion of a folding portable electronic device which can prevent the increase of manufacturing cost, prevent the permeation of water into cases and prevent the cases from being damaged at a folding operation, and a waterproof structure of the folding portable electronic device.

Solution to Problem

A cushion of a folding portable electronic device according to the present invention is a cushion of a folding portable electronic device comprising one case and the other case and being settable to a closed state where one surface of the one case is covered with the other case and an opened state where the one surface is opened, characterized by including a projecting part which is disposed in the one case and projects from the one surface to come in contact with the other case in the closed state; and a body part having a side surface sandwiched between an outer surface of a frame constituent member which constitutes a frame of the one surface and an inner surface of a back surface constituent member to cover a back surface which is the surface on a side opposite to the one surface of the one case, whereby the body part closely comes in contact therewith.

A waterproof structure of a folding portable electronic device according to the present invention is a waterproof structure of a folding portable electronic device comprising one case and the other case and being settable to a closed state where one surface of the one case is covered with the other case and an opened state where the one surface is opened, characterized by comprising a cushion including: a projecting part which is disposed in the one case and projects from the one surface to come in contact with the other case in the closed state; and a body part having a side surface sandwiched between an outer surface of a frame constituent member which constitutes a frame of the one surface and an inner surface of a back surface constituent member to cover a back surface which is the surface on a side opposite to the one surface of the one case, whereby the body part closely comes in contact therewith.

Advantageous Effects of Invention

According to the present invention, a projecting part of a cushion disposed in one case comes in contact with the other case in a closed state, and hence it is possible to prevent the cases from being damaged. Moreover, a body part of the cushion is sandwiched between an outer surface of a frame constituent member and an inner surface of a back surface constituent member and closely comes in contact therewith, and hence it is possible to prevent the permeation of water into the cases. Furthermore, since the cushion includes the projecting part and the body part, it is possible to prevent the increases of the number of components and the number of assembling steps, and it is possible to prevent the increase of manufacturing cost of a folding portable electronic device.

DESCRIPTION OF EMBODIMENT

Figure 1:
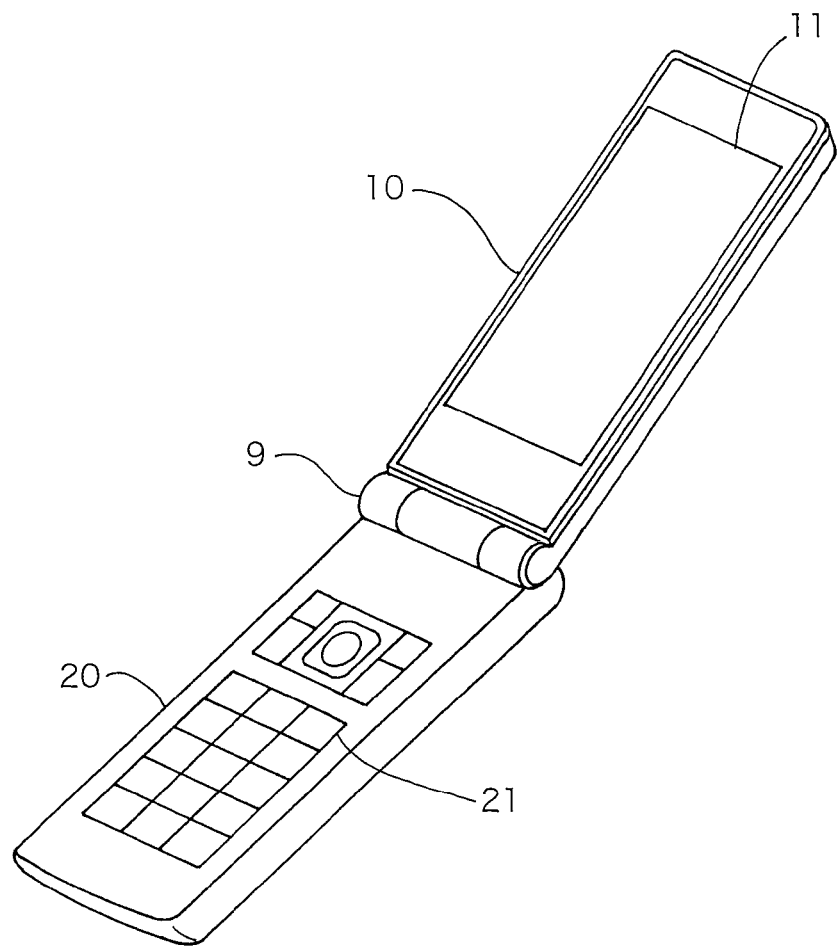
FIG. 1 is a perspective view showing the appearance of a cushion of a folding portable electronic device.

An exemplary embodiment of a cushion of a folding portable electronic device according to the present invention will be described with reference to the drawings. FIG. 1 is a perspective view showing the appearance of the folding portable electronic device.

The cushion of the folding portable electronic device according to the present invention is disposed in the folding portable electronic device including an upper case 10 provided with a display section 11, and a lower case 20 connected to the upper case 10 via a hinge 9 and provided with an operating section 21 as shown in FIG. 1. In the folding portable electronic device, the upper case 10 turns around an end thereof which is a shaft where the upper case is connected to the lower case 20 via the hinge 9, and the device is settable to a closed state where the display section 11 is covered with the operating section 21 of the lower case 20 and an opened state where the display section 11 is opened. It is to be noted that FIG. 1 shows the folding portable electronic device set to the opened state.

Figure 2:
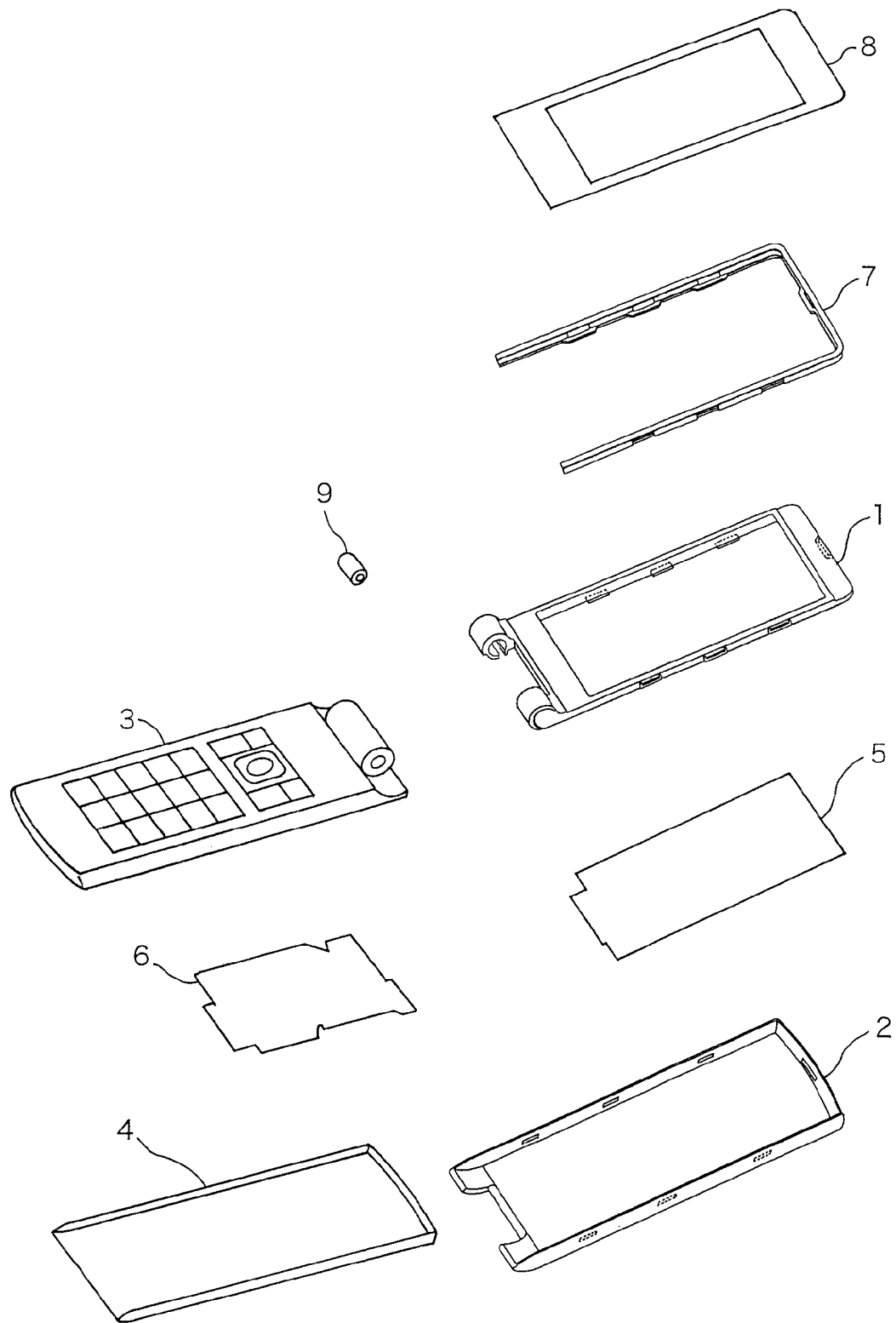
FIG. 2 is an exploded perspective view showing the folding portable electronic device.

FIG. 2 is an exploded perspective view showing the folding portable electronic device. FIG. 2 shows that the upper case 10 includes a screen 8, a waterproof abutment cushion 7, an upper front case 1, an upper circuit substrate 5, and an upper rear case 2. Moreover, FIG. 2 shows that the lower case 20 includes a lower front case 3, a lower circuit substrate 6, and a lower rear case 4.

As shown in FIG. 2, the upper front case 1 is formed into a thin plate-like rectangular parallelepiped shape provided with a hollow portion. Moreover, one side surface of the upper front case 1 is provided with connecting portions to be connected to the lower case 20 via the hinge 9.

The waterproof abutment cushion 7 is a resin such as a rubber formed into such a U-shape as to cover the other side surfaces of the upper front case 1 excluding the one side surface provided with the connecting portions. Moreover, the waterproof abutment cushion 7 is disposed between an outer surface of the upper front case 1 and an inner wall (an inner surface) of the upper rear case 2.

Figure 3:
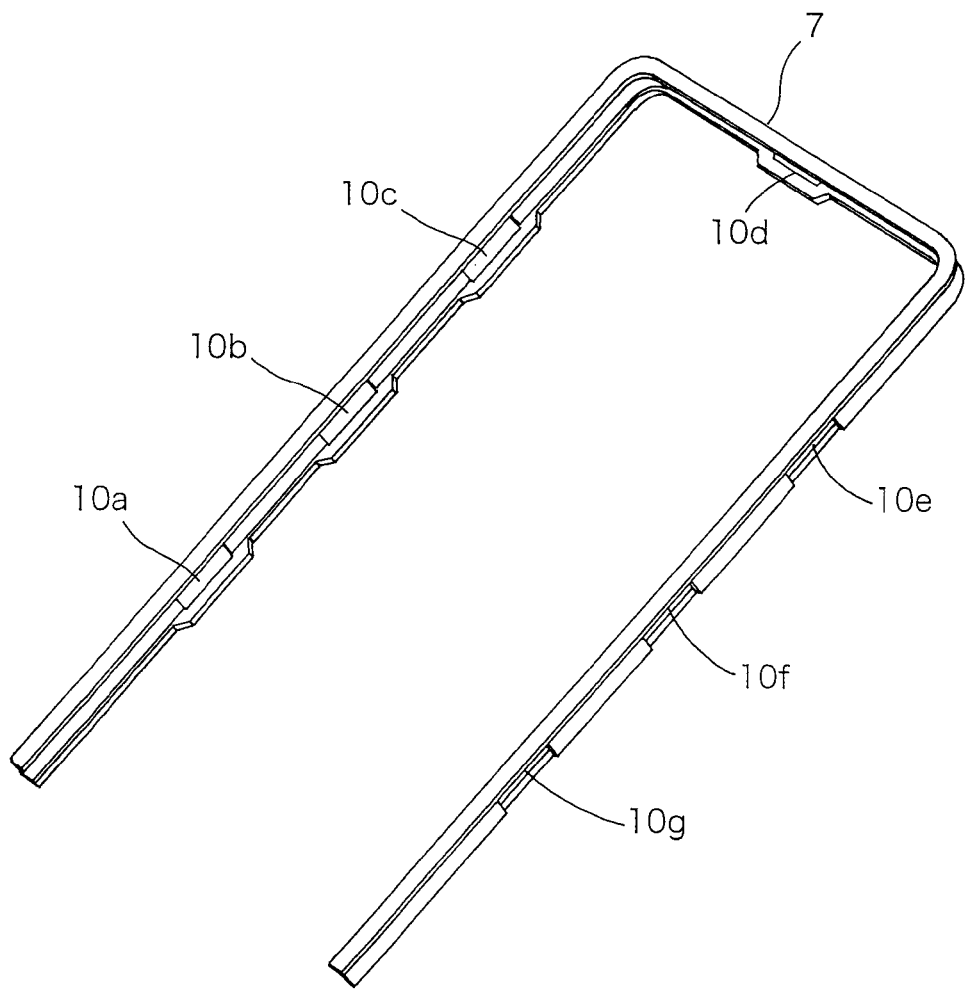
FIG. 3 is a perspective view showing the appearance of a waterproof abutment cushion.

FIG. 3 is a perspective view showing the appearance of the waterproof abutment cushion 7. As shown in FIG. 3, the waterproof abutment cushion 7 includes two long sides which are parallel to each other and one short side which connects ends on the one side of the two long sides to each other thereof, and thus the waterproof abutment cushion 7 is formed into a U-shape.

Figure 4:
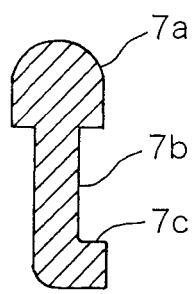
FIG. 4 is a sectional view of the waterproof abutment cushion.

FIG. 4 is a sectional view of the waterproof abutment cushion 7. As shown in FIG. 4, the waterproof abutment cushion 7 is formed into a shape including a head part 7a disposed in an upper part, a hem part 7c disposed in a lower part, and a body part 7b connecting the head part 7a to the hem part 7c. As shown in FIG. 4, a width of the head part 7a is larger than that of the body part 7b. Moreover, the hem part 7c is tilted toward the inside of the U-shaped waterproof abutment cushion 7 and connected to the body part 7b.

Furthermore, the body part 7b is provided with through holes 10a to 10g which are holes for fitting the cushion into the upper front case 1 and the upper rear case 2. As shown in FIG. 3, the through holes 10a to 10c are disposed in the one long side of the waterproof abutment cushion 7. Moreover, the through holes 10d to 10f are disposed in the other long side of the waterproof abutment cushion 7. The through hole 10g is disposed in the short side of the waterproof abutment cushion 7.

In addition, portions of the hem part 7c in the vicinities of the respective through holes 10a to 10g are formed so as to become longer than the other portions.

Figure 5:
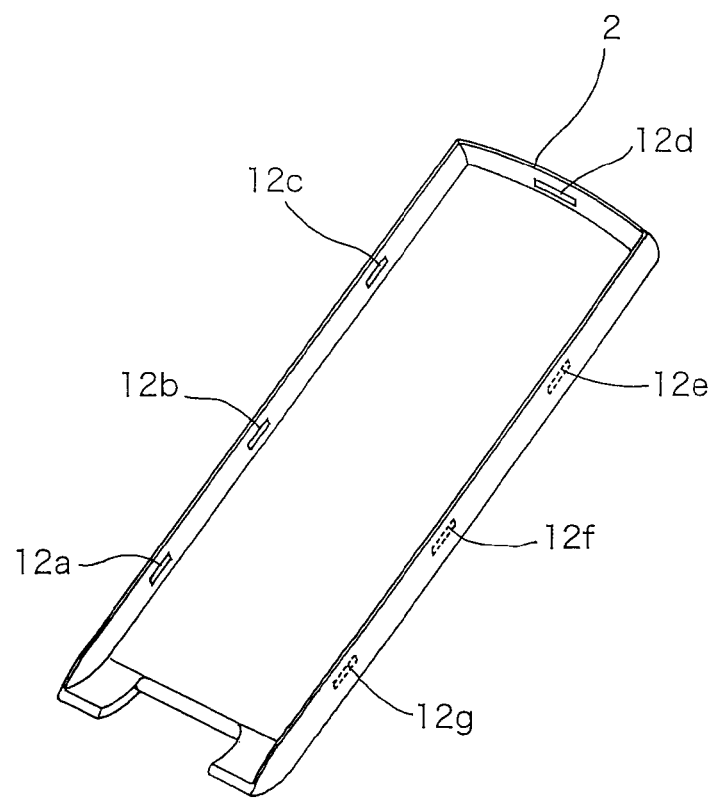
FIG. 5 is a perspective view showing the appearance of an upper rear case.

FIG. 5 is a perspective view showing the appearance of the upper rear case 2. As shown in FIG. 5, claw portions 12a to 12g having a convex shape are disposed at positions corresponding to the through holes 10a to 10g of the waterproof abutment cushion 7, in the inner wall of the upper rear case 2.

Figure 6:
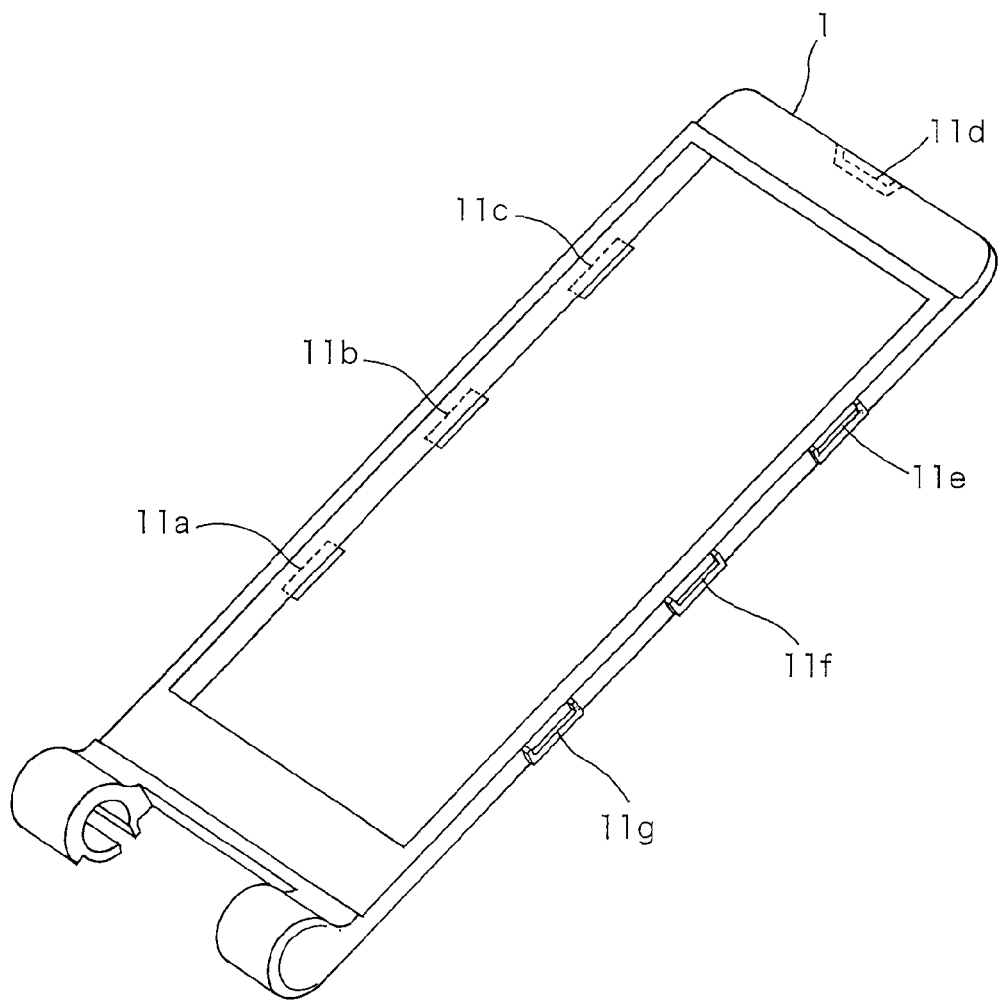
FIG. 6 is a perspective view showing the appearance of an upper front case.

FIG. 6 is a perspective view showing the appearance of the upper front case 1. As shown in FIG. 6, fitting portions 11a to 11g having a convex shape are disposed at positions corresponding to the through holes 10a to 10g of the waterproof abutment cushion 7, in the outer surface of the upper front case 1.

Figure 7:
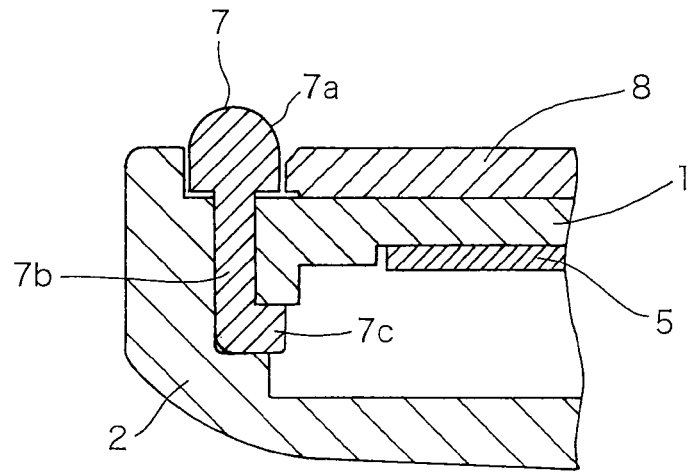
FIG. 7 is a sectional view of a part of an upper case from which through holes of the waterproof abutment cushion, claw portions of the upper rear case and fitting portions of the upper front case are omitted.

FIG. 7 is a sectional view of a part of the upper case 10 from which the through holes 10a to 10g of the waterproof abutment cushion 7, the claw portions 12a to 12g of the upper rear case 2 and the fitting portions 11a to 11g of the upper front case 1 are omitted.

As shown in FIG. 7, the body part 7b of the waterproof abutment cushion 7 of the upper case 10 is sandwiched between the inner wall of the upper rear case 2 and the outer surface of the upper front case 1 and closely comes in contact therewith, and hence it is possible to prevent the permeation of water from the outside to the inside of the upper case 10.

Moreover, as shown in FIG. 7, an upper edge of the head part 7a of the waterproof abutment cushion 7 of the upper case 10 projects upwardly from the upper front case 1, the upper rear case 2 and the screen 8. Therefore, when the folding portable electronic device changes from the opened state to the closed state, the lower case 20 comes in contact with the upper edge of the head part 7a of the waterproof abutment cushion 7 formed of a resin such as the rubber, and does not come in contact with the upper front case 1, the upper rear case 2 and the screen 8, and hence it is possible to prevent the lower case 20 and the upper case 10 from being damaged.

As shown in FIG. 7, in the upper case 10, the lower surface of the head part 7a of the waterproof abutment cushion 7, the side surface of the body part 7b and the upper surface of the hem part 7c are formed in such a shape as to hold an end of the upper front case 1 therein, and hence it is possible to prevent the waterproof abutment cushion 7 from dropping down from the upper front case 1 in an assembling process of the upper case 10. Therefore, an assembling operation of the upper case 10 can be made easier.

Figure 8:
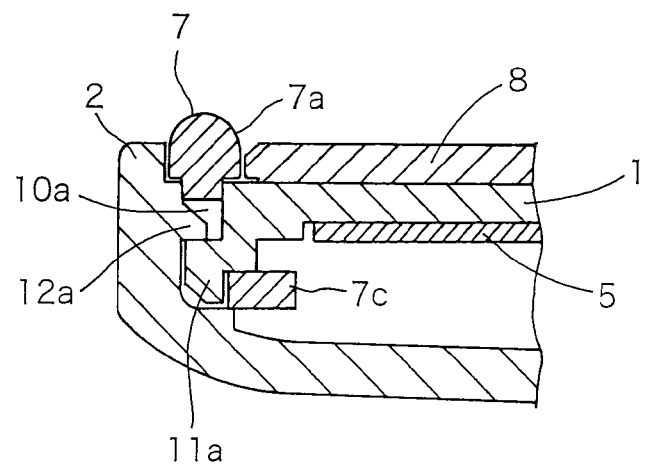
FIG. 8 is a sectional view of a part of the upper case which is provided with the through hole of the waterproof abutment cushion, the claw portion of the upper rear case, and the fitting portion of the upper front case.

FIG. 8 is a sectional view of a part of the upper case 10 which is provided with the through hole 10a of the waterproof abutment cushion 7, the claw portion 12a of the upper rear case 2, and the fitting portion 11a of the upper front case 1. It is to be noted that the part provided with the through hole 10a of the waterproof abutment cushion 7, the claw portion 12a of the upper rear case 2 and the fitting portion 11a of the upper front case 1 will be described as an example, but in the upper case 10, parts provided with the through holes 10b to 10g of the waterproof abutment cushion 7, the claw portions 12b to 12g of the upper rear case 2 and the fitting portions 11b to 11g of the upper front case 1 also have a similar constitution.

As shown in FIG. 8, the lower side of the claw portion 12*a* of the upper rear case 2 is provided with a surface (hereinafter referred to as the claw portion bottom surface). The fitting portion 11*a* of the upper front case 1 is connected to a lower end of the outer surface of the upper front case 1. Moreover, the upper side of the fitting portion 11*a* of the upper front case 1 is provided with a surface which abuts on the claw portion bottom surface of the claw portion 12*a* of the upper rear case 2. The fitting portion 11*a* of the upper front case 1 abuts on the claw portion bottom surface of the claw portion 12*a* of the upper rear case 2 in the through hole 10*a* of the waterproof abutment cushion.

According to the present embodiment, since the head part 7*a* of the waterproof abutment cushion 7 comes in contact with the lower case 20 in the closed state of the folding portable electronic device, it is possible to prevent the upper case 10 and the lower case 20 from being damaged. Moreover, since the body part 7*b* of the waterproof abutment cushion 7 is sandwiched between the outer surface of the upper front case 1 and the inner surface of the upper rear case 2 and closely comes in contact therewith, it is possible to prevent the permeation of water into the upper case 10. Furthermore, since the waterproof abutment cushion 7 includes the head part 7*a* and the body part 7*b*, the number of components and the number of assembling steps do not increase, but it is possible to realize the waterproofing of the folding portable electronic device and the preventing of the upper case 10 and the lower case 20 from being damaged.

Figure 9:
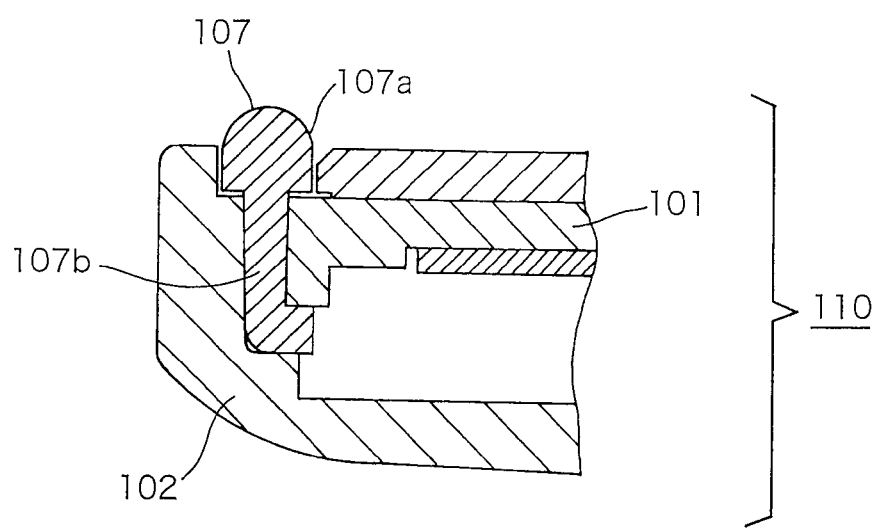
FIG. 9 is a sectional view showing a summary of the present invention.

Next, a summary of the present invention will be described. FIG. 9 is a sectional view showing the summary of the present invention. As shown in FIG. 9, a cushion 107 according to the present invention includes a projecting part 107*a* (corresponding to the head part 7*a* shown in FIG. 4, FIG. 7 and FIG. 8) which is disposed in one case 110 (corresponding to the upper case 10 shown in FIG. 1) and projects from one surface (the surface constituted by the upper front case 1 and the screen 8 shown in FIG. 2, and opposed to the lower case 20 in the closed state) to come in contact with the other case (the lower case 20 shown in FIG. 1) in the closed state; and a body part 107*b* having a side surface sandwiched between an outer surface of a frame constituent member 101 (corresponding to the upper front case 1 shown in FIG. 2, FIG. 6, FIG. 7 and FIG. 8) which constitutes a frame of the one surface and an inner surface of a back surface constituent member 102 (corresponding to the upper rear case 2 shown in FIG. 2, FIG. 5, FIG. 7 and FIG. 8) to cover a back surface which is the surface on a side opposite to the one surface of the one case, whereby the body part closely comes in contact therewith.

According to such a constitution, since the projecting part 107*a* of the cushion 107 comes in contact with the other case in the closed state of the folding portable electronic device, it is possible to prevent the one case 110 and the other case from being damaged. Moreover, since the body part 107*b* of the cushion 107 is sandwiched between the outer surface of the frame constituent member 101 and the inner surface of the back surface constituent member 102 and closely comes in contact therewith, it is possible to prevent the permeation of water into the one case 110. Furthermore, since the cushion 7 includes the projecting part 107*a* and the body part 107*b*, the number of components and the number of assembling steps do not increase, but it is possible to realize the waterproofing of the folding portable electronic device and the preventing of the one case 110 and the other case from being damaged.

Moreover, in the above exemplary embodiment, the cushion of the folding portable electronic device according to the following (1) to (4) is also disclosed.

(1) The cushion 107 of the folding portable electronic device, wherein on the outer surface of the frame constituent member 101 of the one case 110, there are disposed fitting portions having a convex shape and provided with upper surfaces which abut on bottom surfaces of claw portions having a convex shape and disposed on the inner surface of the back surface constituent member 102, the cushion including through holes through which the fitting portions of the frame constituent member 101 pass, so that the upper surfaces of the fitting portions abut on the bottom surface of the back surface constituent member 102. According to such a constitution, the cushion 107 is disposed by engaging convex parts of the frame constituent member 101 and the back surface constituent member 102 with each other, and hence, the cushion 107 can easily be assembled in the one case 110, as compared with a case where the cushion 107 is fitted under pressure into the one case. In addition, it is possible to prevent the occurrence of the problem that it becomes difficult to peel the cushion 107, to disassemble the one case 110 or to reuse the cushion 107, which occurs when the cushion 107 is attached to the one case 110 by use of a double-coated adhesive tape. That is, according to the present constitution, the one case 110 can easily be disassembled, and further, the cushion 107 can be reused, unlike the case where the cushion 107 is attached to the one case 110 by use of the double-coated adhesive tape.

(2) The cushion 107 of the folding portable electronic device, wherein the lower side of the projecting part 107*a* is provided with a projecting lower surface which abuts on an end of the frame constituent member 101 on the side of the one surface, the lower side of the body part 107*b* is provided with a hem part which abuts on an end of the bottom surface of the frame constituent member 101, and the end of the frame constituent member 101 is held by the projecting lower surface, and the side surface of the body part and the hem part. According to such a constitution, it is possible to prevent the cushion 107 from dropping down from the frame constituent member 101, in an assembling process of the one case 110. Therefore, the assembling operation of the one case 110 can be facilitated.

(3) The cushion 107 of the folding portable electronic device, which is disposed in the one case provided with a display section (corresponding to the display section 11 shown in FIG. 1).

(4) The cushion 107 of the folding portable electronic device, which is formed into such a U-shape as to cover three surfaces which are perpendicular to the surface of the frame constituent member having a rectangular parallelepiped outer shape on the side of the one surface and to the surface thereof on the side of the back surface and which are not provided with any connecting portions to be connected to the other case.

This application claims the priority on the basis of Japanese Patent Application No. 2010-108010 filed on May 10, 2010, which is incorporated by reference herein in its entirety.

The present invention has been described above with reference to the exemplary embodiment, but the present invention is not limited to the above exemplary embodiment. The constitution and details of the present invention can be subjected to various modifications which can be understood by a person skilled in the art, within the scope of the present invention.

INDUSTRIAL APPLICABILITY

The present invention can be applied to a folding portable electronic device.

REFERENCE SIGNS LIST 1 upper front case
2 upper rear case
3 lower front case
4 lower rear case
5 upper circuit substrate
6 lower circuit substrate
7 waterproof abutment cushion
7a head part
7b body part
7c hem part
8 screen
9 hinge
10 upper case
10a to 10g through hole
11 display section
11a to 11g fitting portion
12a to 12g claw portion
20 lower case
100 cushion
101 frame constituent member
102 back surface constituent member
107a projecting part
107b body part
110 one case

The invention claimed is:

1. A cushion of a folding portable electronic device comprising one case and an other case and being settable to a closed state where one surface of the one case is covered with the other case and an opened state where the one surface is opened,
   the cushion including:
   a projecting part which is disposed in the one case and projects from the one surface to come in contact with the other case in the closed state; and
   a body part having a side surface sandwiched between an outer surface of a frame constituent member which constitutes a frame of the one surface and an inner surface of a back surface constituent member to cover a back surface which is the surface on a side opposite to the one surface of the one case, whereby the body part closely comes in contact therewith;
   wherein on the outer surface of the frame constituent member of one case, there are disposed fitting portions having a convex shape and provided with upper surfaces which abut on bottom surfaces of claw positions having a convex shape and disposed on the inner surface of the back surface constituent member,
   the cushion including;
   through holes through which the fitting portions of the frame constituent member pass, so that upper surfaces of the fitting portions abut on the bottom surface of the back surface constituent member.

2. The cushion of the folding portable electronic device according to claim 1,
   wherein the lower side of the projecting part is provided with a projecting lower surface which abuts on an end of the frame constituent member on the side of the one surface, the lower side of the body part is provided with a hem part which abuts on the bottom surface of frame constituent member, and the end of the frame constituent member is held by the projecting lower surface, and the side surface of the body part and the hem part.

3. The cushion of the folding portable electronic device according to claim 1,
   which is disposed in the one case provided with a display section.

4. The cushion of the folding portable electronic device according to claim 1,
   which is formed into such a U-shape as to cover three surfaces which are perpendicular to the surface of the frame constituent member having a rectangular parallelepiped outer shape on the side of the one surface and to the surface thereof on the side of the back surface and which are not provided with any connecting portions to be connected to the other case.

5. A waterproof structure of a folding portable electronic device comprising one case and an other case and being settable to a closed state where one surface of the one case is covered with the other case and an opened state where the one surface is opened,
   the waterproof structure comprising:
   a cushion including: a projecting part which is disposed in the one case and projects from the one surface to come in contact with the other case in the closed state; and a body part having a side surface sandwiched between an outer surface of a frame constituent member which constitutes a frame of the one surface and an inner surface of a back surface constituent member to cover a back surface which is the surface on a side opposite to the one surface of the one case, whereby the body part closely comes in contact therewith;
   wherein on the outer surface of the frame constituent member of the one case, there are disposed fitting portions having a convex shape and provided with the upper surfaces which abut on bottom surfaces of claw portions having a convex shape and disposed on the inner surface of the back surface constituent member, and
   the cushion includes through holes which the fitting portions of the frame constituent member pass, so that the upper surfaces of the fitting portions abut on the bottom surface of the back surface constituent member.

* * * * *